(12) United States Patent
Theis et al.

(10) Patent No.: US 7,718,150 B2
(45) Date of Patent: May 18, 2010

(54) REVERSE PLATINUM GROUP METAL ZONED LEAN $NO_x$ TRAP SYSTEM AND METHOD OF USE

(75) Inventors: Joseph Robert Theis, Rockwood, MI (US); Robert Walter McCabe, Novi, MI (US); Justin Anthony Ura, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 120 days.

(21) Appl. No.: 12/048,670

(22) Filed: Mar. 14, 2008

(65) Prior Publication Data
US 2008/0260610 A1 Oct. 23, 2008

Related U.S. Application Data

(60) Provisional application No. 60/923,808, filed on Apr. 17, 2007.

(51) Int. Cl.
| | |
|---|---|
| *B01D 53/56* | (2006.01) |
| *B01D 53/94* | (2006.01) |
| *B01J 23/42* | (2006.01) |
| *B01J 23/46* | (2006.01) |
| *F01N 3/10* | (2006.01) |
| *F01N 3/28* | (2006.01) |

(52) U.S. Cl. ............ 423/213.2; 423/213.5; 423/213.7; 423/239.1; 60/282; 60/299; 60/301; 60/302; 502/304; 502/325

(58) Field of Classification Search ............ 423/213.2, 423/213.5, 213.7, 239.1; 60/282, 299, 301, 60/302; 502/304, 325
See application file for complete search history.

(56) References Cited

U.S. PATENT DOCUMENTS 5,397,545 A 3/1995 Balling et al.

(Continued)

FOREIGN PATENT DOCUMENTS

EP 1 094 206 A2 4/2001

(Continued)

OTHER PUBLICATIONS

"Lean NOx Trap System Design for Cost Reduction and Performance Improvement", Joseph Thesis, Jason Lupescu, Justin Ura, and Robert McCabe, 2006-01-1069, Copyright 2005 SAE International, pp. 1-16.

(Continued)

*Primary Examiner*—Timothy C Vanoy
(74) *Attorney, Agent, or Firm*—Damian Porcari; Brooks Kushman P.C.

(57) ABSTRACT

The invention, in at least one embodiment, relates to a reverse platinum group metal zoned lean $NO_x$ trap system included in a vehicle and its method of use. One embodiment of the trap system is in a vehicle exhaust system operable during lean and rich periods. The trap system may include a first trap having a first substrate supporting a quantity of platinum and a second trap, positioned downstream of the first trap, and having a second substrate supporting a quantity of platinum and a quantity of rhodium. The total loading of platinum plus rhodium on the second trap is greater than or equal to the platinum on the first trap. In at least one embodiment, the second trap has a higher overall $NO_x$ conversion at a low temperature and the first trap has a higher overall $NO_x$ conversion at a high temperature.

21 Claims, 5 Drawing Sheets

U.S. PATENT DOCUMENTS

| | | | |
|---|---|---|---|
| 5,525,307 A | 6/1996 | Yasaki et al. | |
| 6,336,320 B1 | 1/2002 | Tanaka et al. | |
| 6,391,822 B1 | 5/2002 | Dou et al. | |
| 6,539,709 B2 | 4/2003 | Kubo et al. | |
| 2001/0003245 A1 | 6/2001 | Yahagi | |
| 2003/0172645 A1 | 9/2003 | Schnaibel et al. | |
| 2004/0055278 A1 | 3/2004 | Miyoshi et al. | |
| 2004/0082470 A1 | 4/2004 | Gandhi et al. | |
| 2006/0100098 A1 | 5/2006 | Ura et al. | |
| 2006/0117736 A1 | 6/2006 | Twigg | |
| 2006/0168948 A1* | 8/2006 | Xu et al. | 60/295 |
| 2008/0282670 A1* | 11/2008 | McCarthy et al. | 60/274 |

FOREIGN PATENT DOCUMENTS

| | | |
|---|---|---|
| EP | 1 048 828 B1 | 1/2003 |
| EP | 1 273 773 A2 | 1/2003 |
| GB | 2 313 796 A | 12/1997 |
| GB | 2 342 055 A | 4/2000 |
| WO | 2006080369 A1 | 8/2006 |

OTHER PUBLICATIONS

"The Effects of Platinum and Rhodium on the Functional Properties of a Lean NOx Trap", SAE Paper 2007-01-1055, Joseph Theis, Justin Ura, and Bob McCabe, Ford Motor Company, Apr. 18, 2007.

UK Intellectual Property Office Search Report Under Section 15, Application No. GB0806993.2 Dated Aug. 4, 2008.

* cited by examiner

REVERSE PLATINUM GROUP METAL ZONED LEAN $NO_x$ TRAP SYSTEM AND METHOD OF USE

CROSS-REFERENCE TO RELATED APPLICATIONS

This application claims the benefit of U.S. Provisional Application Ser. No. 60/923,808 filed Apr. 17, 2007.

BACKGROUND

1. Technical Field

One or more embodiments of this invention relate to a reverse platinum group metal zoned lean $NO_x$ trap system in a vehicle and its method of use.

2. Background

Environmental regulations pertaining to the reduction of emissions from vehicular engines have been enacted in many countries. The oxides of nitrogen are of concern regarding emissions and include several compounds such as nitric oxide and nitrogen dioxide. These compounds are frequently referred to as $NO_x$ as defined by the United States Environmental Protection Agency.

$NO_x$ emissions from a lean burn gasoline engine or a diesel engine can be treated using a lean $NO_x$ trap at temperatures between 200° C. and 600° C. In the treatment method using the lean $NO_x$ trap, there is an interplay between the platinum group metals ("PGMs"), the emission temperature, $NO_x$ storage components, and/or oxygen storage components. As an example of this interplay, the lean $NO_x$ trap typically may use platinum and rhodium as a remediation catalyst. Platinum may oxidize nitric oxide in the exhaust to nitrogen dioxide under lean exhaust conditions at relatively high temperature. Nitrogen dioxide may react with a $NO_x$ storage material to form an adsorbed $NO_x$ species, such as a nitrate. The $NO_x$ storage material may become saturated or nearly saturated with adsorbed $NO_x$ species. To purge the $NO_x$ species, the engine may be changed from a lean air-to-fuel ratio to a rich air-to-fuel ratio. During the rich condition purges, both platinum and rhodium may contribute to the reduction of the stored $NO_x$ to nitrogen gas. Rhodium typically functions with a superior reactivity in reducing $NO_x$ relative to platinum at relatively low exhaust temperatures.

However, lean $NO_x$ traps may be costly due to relatively high concentrations of platinum group metals in the formulations. Reverse platinum group metal zoned lean NOx trap systems may reduce some of the costs of the lean NOx trap system. An example of a reverse platinum group metal zoned lean NOx trap is disclosed in U.S. Application Publication No. 2006/0100098 assigned to a common owner with this application and having some inventors in common.

SUMMARY

At least one aspect of the present invention is that NOx remediation could be accomplished at the same overall NOx conversion efficiency using less of the relatively expensive platinum group metals in the formulations.

At least one embodiment of the present invention relates to a reverse platinum group metal zoned lean $NO_x$ trap system for remediating a $NO_x$ emission in an exhaust system that has an exhaust stream. The trap system is capable of operation during one or more lean periods and one or more rich periods. The trap system includes a first trap having a first substrate connected to the exhaust system of the vehicle. The first substrate supports a quantity of platinum. In certain applications, the first substrate also supports a relatively small amount of rhodium. The trap system further comprises a second trap having a second substrate connected to the exhaust system of the vehicle. The second substrate supports a quantity of platinum and a quantity of rhodium. In one or more applications of the present invention, an amount of palladium is supported by the first and/or second substrates.

The first trap is positioned upstream from the second trap relative to a direction of exhaust flow. In the system, the total quantity of platinum and rhodium on the second trap equals or exceeds the platinum quantity on the first trap.

The second trap has a higher overall $NO_x$ conversion than the front trap in a low temperature range.

The first trap has a higher overall $NO_x$ conversion than the second trap at a high temperature range.

In another embodiment of the present invention a trap system is capable of operation during one or more lean periods and one or more rich periods. The trap system includes a first portion having a first substrate portion supporting a quantity of platinum and a second portion having a second substrate portion supporting a quantity of platinum and a quantity of rhodium. The first portion is positioned upstream from the second portion relative to the direction of the exhaust flow. In the exhaust system the total loading of platinum on the first portion is less than a total of loading of platinum and rhodium on the second portion. The second portion has a higher overall $NO_x$ conversion than the first portion at a temperature below 300° C.

In another embodiment of the present invention a method is disclosed for remediating a $NO_x$ emission using a $NO_x$ trap system for a vehicle. The method includes providing an exhaust system from the engine of the vehicle. The exhaust system has a first trap supporting a quantity of platinum and a second trap supporting a quantity of platinum and a quantity of rhodium. The overall quantity of platinum and rhodium on the second trap exceeds the overall quantity of the platinum on the first trap on a mass per unit volume basis. The first trap is positioned closer in the system to the engine than the second trap. The exhaust system is exposed to an exhaust that contains $NO_x$, is at a lean air-to-fuel ratio, and is at an exhaust inlet temperature in the range of 200° C. to 600° C. The exhaust air-to-fuel ratio is subsequently changed to a rich air-to-fuel ratio. Either the first trap or the second trap or both traps reduce the stored $NO_x$ to nitrogen gas in order to remediate the $NO_x$ emission. The first trap remediates more $NO_x$ than the second trap when the exhaust temperature is in the range of 400° C. to 600° C. The second trap remediates more $NO_x$ than the first trap when the exhaust inlet temperature is at a range of 200° C. to 300° C.

DETAILED DESCRIPTION OF EMBODIMENTS OF THE PRESENT INVENTION

Reference will now be made in detail to compositions, embodiments and methods of the present invention known to the inventors, however it should be understood that the disclosed embodiments are merely exemplary of the present invention which may be embodied in various alternative forms. Therefore, specific details disclosed herein are not to be interpreted as limiting, rather merely as a representative basis for teaching one skilled in the art to variously employ the present invention.

Except where expressly indicated, all numerical quantities in this description indicating the amounts of material or conditions of use are to be understood as modified by the word "about" in describing the broadest scope of the present invention. Practice within the numerical limits stated is generally preferred.

Lean $NO_x$ traps may be costly due to the relatively high concentrations of platinum group metals ("PGM") in the formulations. Reverse PGM zoned lean $NO_x$ trap systems may reduce some of the cost of the lean $NO_x$ trap system. An example of a reverse PGM zoned lean $NO_x$ trap is disclosed in U.S. Patent Publication No. 2006/0100098, which is hereby incorporated by reference in its entirety. In one example of a reverse PGM zoned lean $NO_x$ trap system, a front portion and a rear portion of the trap can contain platinum and rhodium. In certain embodiments, the front portion is referred to as the front brick and the rear portion is referred to as the rear brick.

In at least one embodiment of the present invention, the rhodium concentration of the front brick can be totally removed or significantly reduced relative to the example set forth above. In at least one embodiment, this reduction drives a cost saving in the overall lean $NO_x$ trap and/or improves the high temperature $NO_x$ performance of the front brick. In another embodiment, the reduced rhodium content in the front brick can be used to increase the rhodium level in the rear brick. Such an embodiment may improve the high temperature $NO_x$ performance of the front brick, improve the low temperature performance of the rear brick, and/or maintain equal PGM costs.

Figures 1, 2:
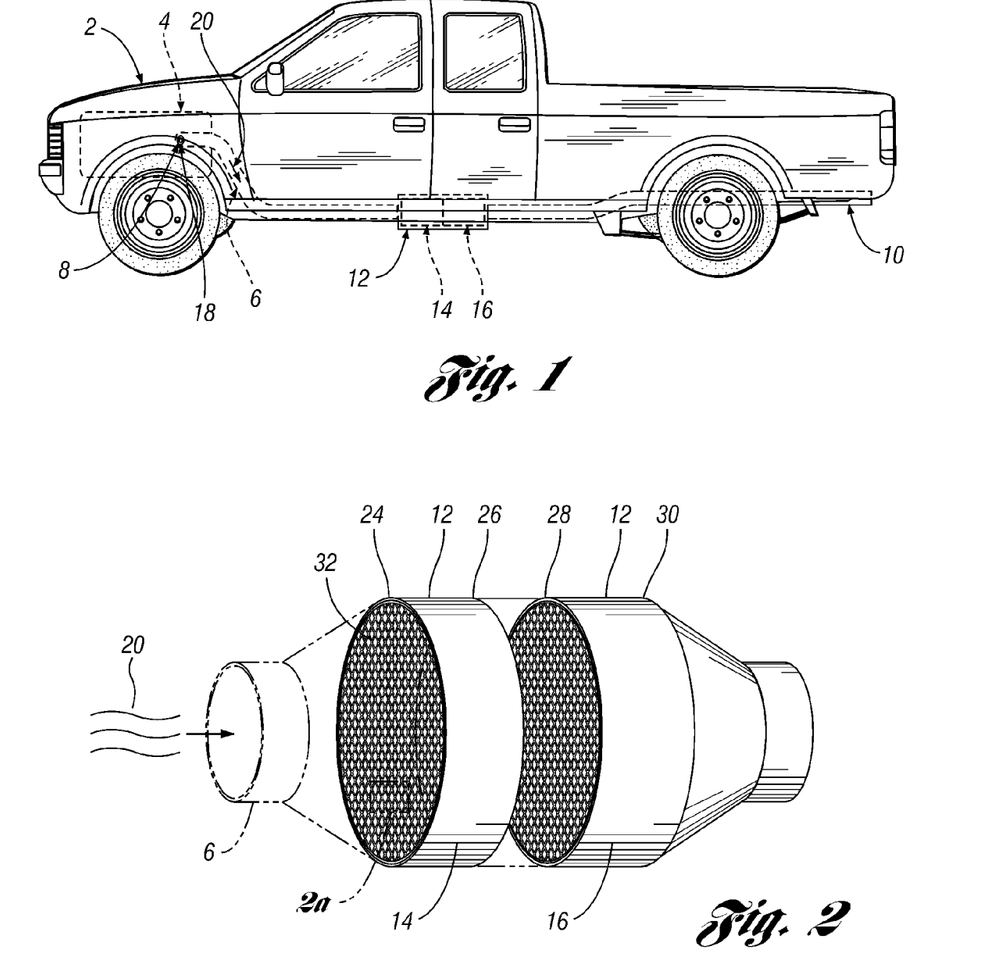
FIG. 1 illustrates a vehicle having an example of a reversed platinum group metal lean zoned $NO_x$ trap system according to at least one embodiment of this invention.
FIG. 2 illustrates a perspective and partially exploded view of the reversed platinum group metal zoned lean $NO_x$ trap system according to at least one embodiment of this invention.

Referring now to FIG. 1, a truck 2 is illustrated in a non-limiting perspective view. The truck 2 is powered by an engine 4 having an exhaust system 6 with an inlet 8 adjacent to the engine 4 and an outlet 10 at the end opposite the engine 4. The exhaust system 6 includes a reverse platinum metal lean $NO_x$ trap system 12 comprising two traps, i.e., first trap 14 and second trap 16 according to at least one embodiment of the invention. At the inlet 8, an optional temperature sensor 18 may measure a temperature of an exhaust 20.

Referring now to FIG. 2, an embodiment of the reverse PGM zoned lean $NO_x$ trap system 12 is illustrated. The system 12 includes first and second traps 14 and 16. The first trap 14 is otherwise referred to as the upstream trap relative to the exhaust stream 20. First trap 14 includes a front end 24 and a rear end 26. Second trap 16 includes front end 28 and rear end 30. The back end 26 of the first trap 14 may be adjacent to the front end 28 of the second trap 16. The traps 14 and 16 are connected to the exhaust system 6 with the first trap 14 being positioned upstream of the second trap 16 relative to the flow of the exhaust 20 as it flows in a direction from the inlet 8 to the outlet 10. The traps 14 and 16 comprise a support 32 adjacent to a layer 34 comprising at least one or more PGM. One embodiment of the support 32 and the layer 34 is illustrated in the detailed view FIG. 2a. It should be understood that the layer 34 appears structurally similar in first and second traps 14 and 16. The first trap 14 may contain at least platinum and optionally rhodium in the layer 34. The second trap 16 may contain at least platinum and rhodium in the layer 34. Further, layer 34 may comprise one or more layers without departing from the spirit of the invention.

According to one or more embodiments of the present invention, there is an extensive interplay of quantities and placement of platinum group metals, temperatures of emissions under various engine conditions, $NO_x$ storage component capacities, and oxygen storage component effects that were unappreciated in previous work. Extensive testing is required to understand the general nature of a response surface formed by at least these four groups of variables.

To take advantage of the response surface formed by the four groups of variables, the exhaust system may be segmented to permit improved performance at relatively low temperatures using certain embodiments of formulations on one of the bricks, for example, the rear brick, and employing certain other formulations on one of the bricks, for example, the front brick to permit improved performance at relatively high temperatures. Under lean conditions platinum is very effective at oxidizing NO to $NO_2$. The nitrogen dioxide then reacts with $NO_x$ storage component barium carbonate to form barium nitrite and carbon dioxide. Platinum may also promote nitrate decomposition, so having relatively low Pt content on the front brick minimizes the decomposition, which is beneficial for the $NO_x$ storage performance at high temperatures. Eventually, the $NO_x$ storage component will begin to saturate. Periodically, as the $NO_x$ capacity of the $NO_x$ storage component is approached, the air to fuel ratio must be driven to a rich condition for a few seconds in order to purge and reduce the stored $NO_x$ content of the $NO_x$ storage component. Purging restores the $NO_x$ storage capacity of the trap.

Under rich conditions hydrogen will decompose the barium nitrate to barium oxide and nitrogen dioxide. The nitrogen dioxide reacts with reductants in exhaust gas 20 which may include hydrogen, carbon monoxide, and hydrocarbons. Platinum and rhodium catalyze the reaction of $NO_2$ and reductants to nitrogen, water, and carbon dioxide. Rhodium is relatively more effective for this reaction at low temperatures.

Designing the first catalyst trap 14 with relatively low amounts of platinum, very low amounts or no rhodium and very low amounts of cerium oxygen storage component provides a beneficial catalyst for high temperature remediation of $NO_x$. However, such a formulation is not particularly effective at relatively low temperatures of 200°-350° C.

Combining the first trap 14 with a second trap 16 having a formulation relatively higher in platinum, rhodium and cerium and a higher rhodium to platinum ratio, provides better remediation of $NO_x$ at low temperatures. Due to the relatively high platinum loading, the second trap 16 will store $NO_x$ as nitrates at relatively low temperatures. When the trap is purged with the rich condition of the exhaust 20 the barium will release the nitrogen dioxide into the reductant gas stream. The mixture of $NO_2$ and reductants is immediately catalyzed to nitrogen, hydrogen and carbon dioxide by the relatively adjacent rhodium sites. At high temperatures, both the platinum and rhodium in the second trap 16 catalyze the reduction of the $NO_x$ to nitrogen.

Lean $NO_x$ traps can provide very high conversion of $NO_x$ when the engine is operated with an air-to-fuel ratio control scheme comprising of extended periods of lean operation with periodic rich purges. However, the catalyst system may be expected to provide high three-way conversion when the air/fuel ratio is controlled near stoichiometry, for example, during high load operation. If the close-coupled catalysts contain low amounts of oxygen storage component (OSC) this limits the ability of these catalysts to convert carbon monoxide and $NO_x$ under stoichiometric conditions. Therefore, unless there is a cerium-containing three-way catalyst downstream of the $NO_x$ trap, the $NO_x$ trap itself must contain some OSC in order to provide high carbon monoxide and $NO_x$ conversion under the oscillatory air-to-fuel conditions characteristic of a closed-loop control system. The presence of cerium in the $NO_x$ trap has been observed to provide other benefits besides improving stoichiometric performance of the trap. The cerium can improve the sulfur tolerance in the trap adsorbing some of the sulfur and preventing that portion of the sulfur from poisoning the $NO_x$ storage sites. The cerium also improves the desulfation characteristics of the trap. In addition, the presence of cerium can improve the $NO_x$ storage capacity at low temperatures as cerium is able to provide some $NO_x$ storage capacity at relatively temperatures (example 300° C.). Finally, the cerium can be beneficial for the thermal durability of the trap as ceria is known to stabilize the dispersion of precious metals.

However, the presence of cerium in the trap can also be responsible for some undesirable effects. Cerium in the trap requires additional reductants (i.e., HC, CO, $H_2$) to purge the $NO_x$ trap, thereby increasing the fuel penalty associated with the purges. A second undesirable effect is that the oxygen storage component provided by the cerium can cause some of the stored $NO_x$ to be released from the trap during the purges without being reduced to nitrogen. Purge $NO_x$ release is particularly evident at temperatures of 350° C. and above. A major source of this $NO_x$ release is attributed to the exotherm that results from the reaction between the reductants in the exhaust and oxygen from the cerium during the transition from lean operation to rich purge conditions.

Therefore, an optional controls strategy for taking advantage of the benefits of cerium and mitigating the disadvantages involves segmenting the cerium between the two traps 14 and 16. In certain embodiments of this invention cerium may be present in the first trap 14 in a range of 0-60 micromoles of oxygen per gram of catalyst at 500° C. in the fresh condition. The cerium in the second trap 16 may range from 30 to 90 micromoles of oxygen per gram of catalyst at 500° C. in the fresh condition. Having an OSC in the formulation creates an exotherm and causes purge $NO_x$ release at high temperatures. But it enhances the $NO_x$ reduction and purgability at low temperatures by providing an additional source for heating up the bricks at low temperature conditions. It is beneficial to have higher OSC concentration in the second trap 16, which does most of the $NO_x$ remediation at the low temperatures. But, it is beneficial to have lower OSC in the front trap 14, which performs most of the $NO_x$ remediation at high temperatures, in order to avoid the undesirable effects described above.

Likewise, segmenting the rhodium is advantageous to getting desired overall $NO_x$ conversion efficiency while using less overall PGMs. As will be shown in the examples below, reducing the quantity of rhodium in the upstream trap 14 does not significantly decrease the overall $NO_x$ conversion efficiency of the first trap, especially at relatively higher inlet temperature of the exhaust. However, adding the equivalent amount of rhodium or less to the rear brick significantly improves the overall $NO_x$ conversion efficiency of the rear brick particularly at relatively low temperatures and rich purge conditions. This higher $NO_x$ conversion at low temperatures helps to purge the second brick so that high $NO_x$ storage efficiency is achieved during lean conditions.

Segmenting the platinum content between the bricks has additional benefits. Relatively low Pt loading on the front brick minimizes nitrate decomposition during high temperature, lean operation. For example, as a result in certain embodiments the first trap 14 may have higher overall $NO_x$ conversion than the second trap 16 because of having less nitrate decomposition during lean $NO_x$ storage periods and less $NO_x$ release during rich purge periods.

The total quantity of PGMs on the first trap 14 may range from quantities selected independently from greater than 15 $g/ft^3$, 20 $g/ft^3$, 25 $g/ft^3$, 30 $g/ft^3$ and 40 $g/ft^3$ to less than 100 $g/ft^3$, 75 $g/ft^3$, 60 $g/ft^3$, 50 $g/ft^3$ and 40 $g/ft^3$ of platinum group metals. The ratio of platinum to rhodium content by weight of the first trap 14 range may be selected independently from 50% platinum to 50% rhodium, 60% platinum to 40% rhodium, 70% platinum to 30% rhodium, 80% platinum to 20% rhodium, 90% platinum to 10% rhodium and 100% platinum to 0% rhodium. It should be further understood that other PGMs, an example of which is palladium, may also be included in this formulation but are included in neither the total PGM content reported nor in the ratio of platinum to rhodium for purposes of certain embodiments of this invention.

When rhodium is shifted from the first trap 14 to the second trap 16, the second trap 16 may now function as the dominant reactive site for overall conversion of $NO_x$ to nitrogen gas when the temperature of the exhaust is 250° C. to 350° C. The PGM content of the second trap 16 may range from quantities selected independently from greater than 20 $g/ft^3$, 25 $g/ft^3$, 30 $g/ft^3$ and 40 $g/ft^3$ to less than 150 $g/ft^3$, 100 $g/ft^3$, 75 $g/ft^3$ 60 $g/ft^3$, 50 $g/ft^3$ and 40 $g/ft^3$. The ratio of platinum to rhodium in the total PGM content may be selected from 50% platinum to 50% rhodium, 60% platinum to 40% rhodium, 70% platinum to 30% rhodium, 80% platinum to 20% rhodium or 90% platinum to 10% rhodium. As in the first trap 14, it should be understood that other PGMs may be present in the second trap within the spirit of this invention. These other PGMs, such as palladium, are not considered in either the platinum group content or the ratio of platinum to rhodium.

The ratio of the quantity of rhodium on the first trap to the quantity of rhodium on the second trap may be selected independently from the range from 0.0, 0.1, 0.15, or 0.2 to 0.25, 0.3, 0.4, or 0.5. The ratio of the quantity of platinum on the first trap to the quantity of platinum on the second trap may be selected independently from the range from 0.1, 0.16, 0.2, or 0.3 to 0.35, 0.4, 0.5, 1.0, 1.2, or less than 2.0 when compared on an equal volume of substrate basis, as above.

It should be further understood that while two lean $NO_x$ traps are illustrated in FIG. 2, a plurality of lean $NO_x$ traps can be used either sequentially or sequentially and in parallel simultaneously within the spirit of the invention. Further, the first and second traps may be segmented on a single catalyst brick.

Figure 2A:
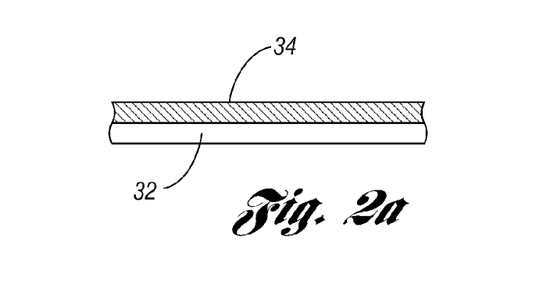
FIG. 2a illustrates an embodiment of a detailed section of a component of the reversed platinum group metal zoned lean $NO_x$ trap system according to at least one embodiment of this invention.

In FIG. 2a, a support 32 for a platinum group metal layer 34 may be a single material and may be applied as one or more washcoat layers. It should be understood that the support 32 could be a composite of a base support and a washcoat or other substrate within the spirit of the invention. The combination of substrate and washcoat is described as a support catalyst. Non-limiting examples of the support 32 include cordierite, mullite, stainless steel, aluminum titanate, and other normally thermally stable materials known in the art. Further, the washcoat may be applied to the support 32 in one or more layers. For example, one layer may contain Rh and be separated from a layer containing Pt or Pd.

While the FIG. 2a illustrates certain embodiments of the lean $NO_x$ trap system 12 where the traps have equal volumes, it should be understood that the volume of the traps may be varied independently as an additional variable in the interplay of the lean $NO_x$ trap system. Non-limiting examples of a ratio between volumes of the first trap and the second trap may include 3:1, 2:1, 1.5:1, 1:1.5, 1:2, or 1:3.

Figure 3:
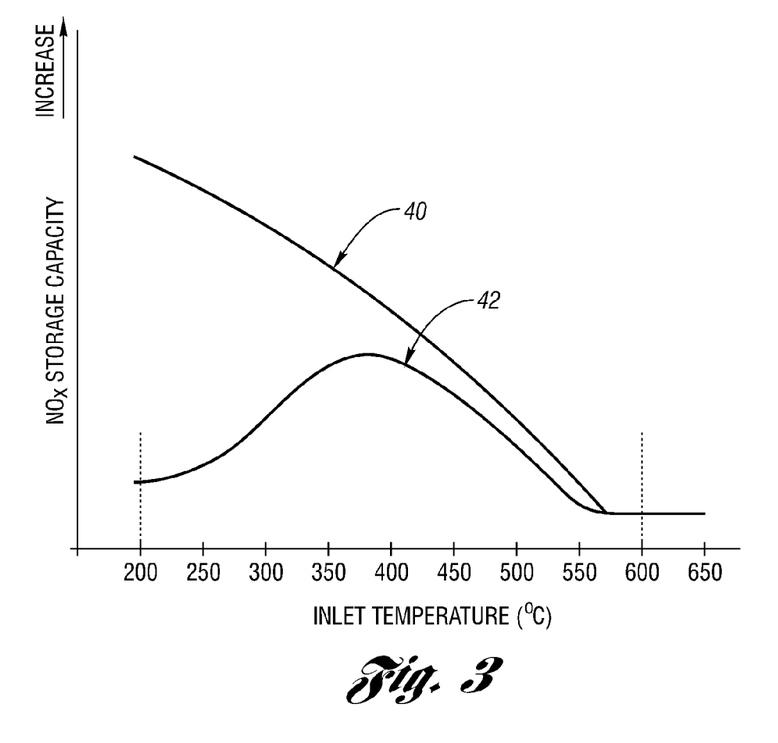
FIG. 3 illustrates a graph of a $NO_x$ storage capacity versus an inlet temperature of an exhaust according to at least one embodiment of this invention.

Referring now to FIG. 3, the graph of the $NO_x$ storage capacity as a function of the inlet temperature of the exhaust 20 has a theoretical maximum $NO_x$ storage capacity as illustrated by a graph line 40 when using $NO_2$ as a feed gas after purging at high temperature according to certain embodiments of this invention. The negative slope of the line 40 indicates that the $NO_x$ storage capacity decreases as the temperature of the exhaust 20 increases.

The effective storage capacity $NO_x$ of a PGM zoned lean $NO_x$ trap according to certain embodiments of this invention is illustrated in a graph line 42 of actual $NO_x$ storage capacity with NO used as the feed gas. When purging at relatively low temperatures, the rate of purging is slow. The trap does not get purged completely during the rich purge period. Therefore, less $NO_x$ can be physically stored during the next lean storage period. In addition, NO is not oxidized as rapidly to $NO_2$. As a consequence, using NO as a feed gas results in reduced $NO_x$ storage. At temperatures ranging from 400° C. to about 550° C., the data in line 42 illustrate that the $NO_x$ storage capacity is approximately approaching the theoretical $NO_x$ storage capacity line 40. While certain embodiments and non-limiting examples include discussions of conversions or storage reactions during lean or rich conditions, it should be understood that the overall $NO_x$ remediation during lean and rich periods is an overall goal. Examples described below may illustrate segments of performance and isolate effects of the interplay between variables that contribute to overall $NO_x$ remediation in the emission.

Figure 4:
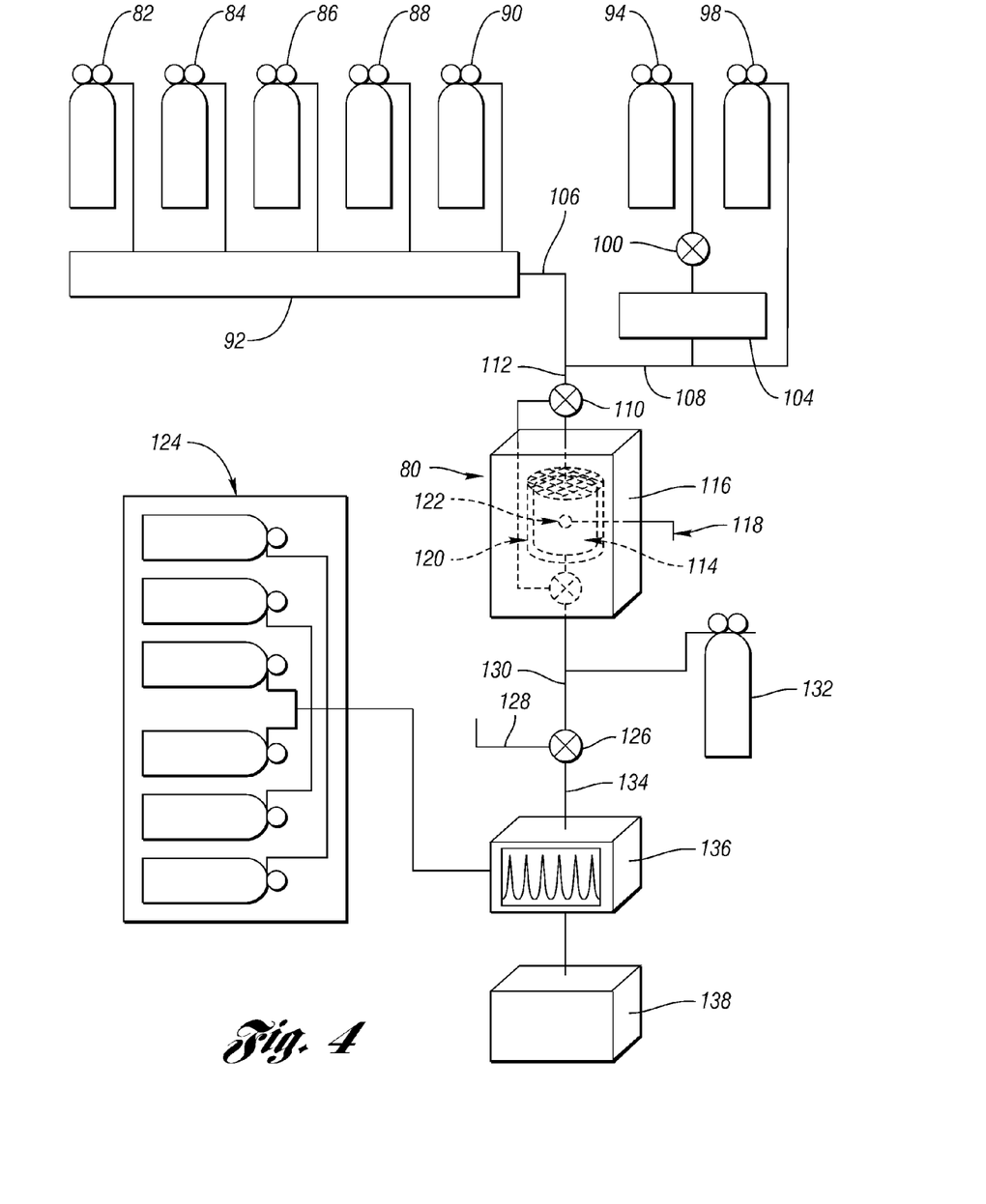
FIG. 4 illustrates an embodiment of a $NO_x$ test apparatus suitable for measuring a $NO_x$ emission of certain reverse platinum group metal zoned $NO_x$ trap components according to at least one embodiment of this invention.

FIG. 4 represents a non-limiting example of a $NO_x$ testing apparatus, especially a 60/5 $NO_x$ conversion test, for evaluating components of the reverse PGM zoned lean $NO_x$ trap system 12.

The test apparatus may be fed from at least five sources of relatively pure gas or mixtures: a nitric oxide test gas 82, a nitrogen dioxide test gas 84, a carbon dioxide test gas 86, a water source 88, and a nitrogen test gas 90. The five test gases 82, 84, 86, 88, and 90 are supplied to a manifold 92 for mixing the gases. It should be understood that the sources of test gases may differ in other test protocols. Examples include using mixtures and impure gases such as NO or $NO_2$, which are both supplied as 2% mixtures in $N_2$ or 25% $H_2$ and 75% CO. Additional gases for establishing particular air-to-fuel ratios and moisture conditions are provided by three sources: a carbon monoxide-hydrogen test gas 94 at a 3:1 by volume ratio and a 100% oxygen source 98. The water from the source 88 is a liquid which is supplied and allowed to evaporate in the test apparatus. The $CO$—$H_2$ 94 and oxygen 98 test gases are added to the system by opening a switch 100, such as an electronically-controlled solenoid valve. This switch 100 allows switching between lean and rich conditions. A timer 104 controls the switch 100. The gases 94 and 98 are piped to the system in a pipe 108. The flow of gases 82, 84, 86, 88, 90, 94, and 98, collectively called the feed gases, pass through a second pipe 106 to a valve 110 into a pipe 112 feeding a reactor 114 housed in a furnace in 116. Valve 110 may be used to bypass the feed gases around reactor 114 in order to allow measurement of feed gas concentrations. The temperature of the furnace is monitored by a thermocouple 118. The furnace defines a cavity 120 into which is positioned a specimen 122 of certain embodiments of the component of the reverse PGM zoned lean $NO_x$ trap system 12.

Gas exiting reactor 114 at about 2.5 L/min is mixed in a dilution pipe 130 about 22.5 L/min of nitrogen from a dilution nitrogen gas 132 to dilute the water concentration from 10% to 1% to prevent condensation in unheated sections of tubing or in an analyzer 136. The dilution process also provides sufficient flow of gas for all analyzer 136 systems.

To calibrate the test apparatus, either undiluted span gases or span gases diluted by $N_2$ in various ratios are provided to generate different concentrations. The spanning gases 124 are piped into analyzer 136. The valve 126 directs gases either to analyzer 136 or a vent 128. It should be understood that the quantity of dilution may vary without departing from the spirit of this invention. An analyzer inlet pipe 134 directs the gases 82, 84, 86, 88, 90, 94 and 98 after reaction with the specimen 122 and dilution to an analyzer 136. Analyzer 136 provides at least one signal to a data acquisition system 138.

Non-limiting examples of the span gases 124 may include nitric oxide at 50 ppm, carbon monoxide at 5%, and carbon dioxide at 10%.

Figure 5:
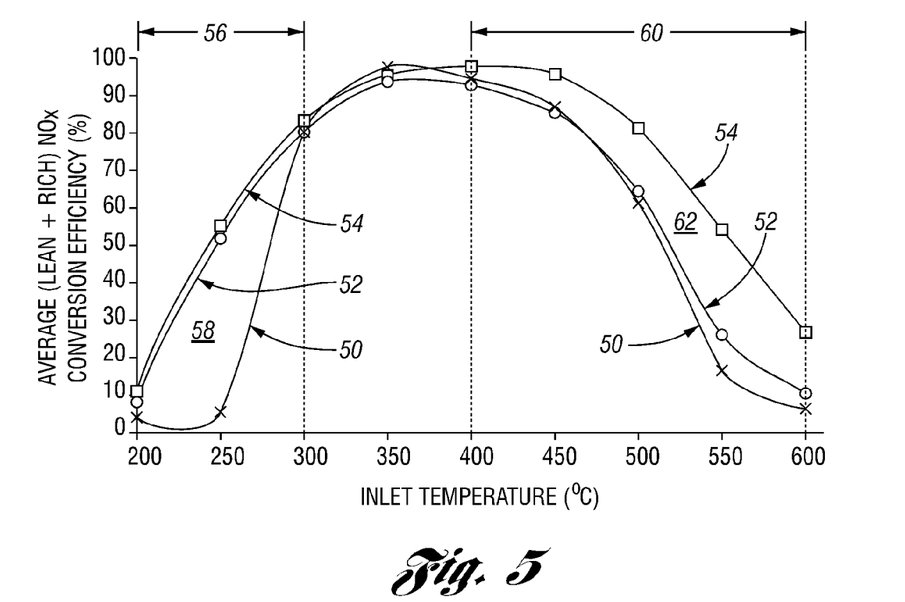
FIG. 5 illustrates an average lean plus rich condition $NO_x$ conversion efficiency as a function of the inlet temperature of the exhaust for certain examples of the reverse platinum group metal lean zoned $NO_x$ trap component according to at least one embodiment of this invention.

Referring now to FIG. 5, the average $NO_x$ conversion efficiency of a test specimen, in percent, as a function of the inlet temperature is illustrated in a graph. The average includes data from a rich condition plus a lean condition as described in experiments below. An Overall $NO_x$ Conversion Test, called the 60/5 test as depicted in FIG. 5, includes a cycle that is 60 seconds in the lean air-to-fuel conditions ("the lean period") and five seconds in the rich air-to-fuel conditions ("the rich period"). Inlet gas concentrations in this test are as follows: nitric oxide at 500 ppm by volume, carbon dioxide 10% by volume, water vapor at 10% by volume, oxygen at 5% by volume when the lean conditions are used, and carbon monoxide at 5% by volume and hydrogen at 1.7% by volume when the rich conditions are used.

It should be understood that a length of time of the lean period and a length of time of the rich period may vary without departing from the spirit of the invention. Examples of the length of time of the lean condition may range from times selected independently from greater than 5 seconds, 30 seconds, 45 seconds, 60 seconds, 75 seconds, and 100 seconds to less than 1000 seconds, 200 seconds, 150 seconds and 120 seconds. Examples of the length of time of the rich condition may range from times independently selected from greater than 0.5 seconds, 1 second, 3 seconds, 5 seconds, 7 seconds, 10 seconds, 30 seconds and less than 300 seconds to less than 500 seconds, 50 seconds, 40 seconds, 30 seconds and 20 seconds. It is understood that these settings may be adjusted to assess different parameters such as conversion efficiency or storage capacity.

The reverse PGM zoned lean $NO_x$ trap components (first and second traps 14 and 16 in FIG. 2) in this experiment are fresh and not aged. A space velocity of the exhaust 20 flowing through the illustrated embodiments is 25,000 per hour. It should be understood that the space velocity of the illustrated embodiments may vary without departing from the spirit of the invention. Examples of space velocity may be selected independently from a range of 5,000/hr, 10,000/hr, 20,000/hr, 30,000/hr, 40,000/hr, 50,000/hr and less than 100,000/hr. The PGM content of each of these components illustrated in this non-limiting example is 28.3 g/ft$^3$.

A graph line 50 in FIG. 5 illustrates the average $NO_x$ conversion efficiency of the lean $NO_x$ trap component having 83.5% platinum content by weight and 16.5% rhodium content and the total PGM loading of 28.5 g/ft$^3$. This line 50 indicates the relatively lower conversion efficiency at a lower temperature range 56 between 200° C. and 300° C. when the rhodium content is relatively low.

A graph line 52 illustrates the average $NO_x$ conversion efficiency of a lean $NO_x$ trap component having 50% platinum content by weight and 50% rhodium content. The total PGM loading is also 28.5 g/ft$^3$. This line highlights the greatly improved remediation efficiency at the relatively low temperature of 200° C. to 300° C. regime 56 versus the rhodium-poor specimen of line 50. This line 52 also indicates that the rhodium content has almost no effect at a higher temperature range 60 between 400° C. and 600° C. because it is effectively the same as the line 50 where a lesser amount of rhodium is present.

A graph line 54 illustrates a reverse PGM zoned lean $NO_x$ trap having the first trap 14 comprising 100% platinum and the second trap 16 having 50% platinum content by weight and 50% rhodium content. The PGM loading on the front Lean $NO_x$ Trap (LNT) was 23.8 g/ft$^3$ (Pt only). The loading on the back LNT was 28.5 g/ft$^3$ (Pt and Rh). The unexpected difference between the efficiency of this specimen and the other two examples is illustrated by a gap 58 between line 54 and line 50 in a relatively low temperature regime 56 and a gap 62 between the line 54 and either of the lines 50 or 52 in a relatively high temperature regime 60.

This figure demonstrates that certain embodiments of a reversed platinum group metal zoned lean $NO_x$ trap system 12 broaden the process window of $NO_x$ remediation as a function of temperature, non-limiting extremes of which are the gaps 58 and 62.

Figure 6:
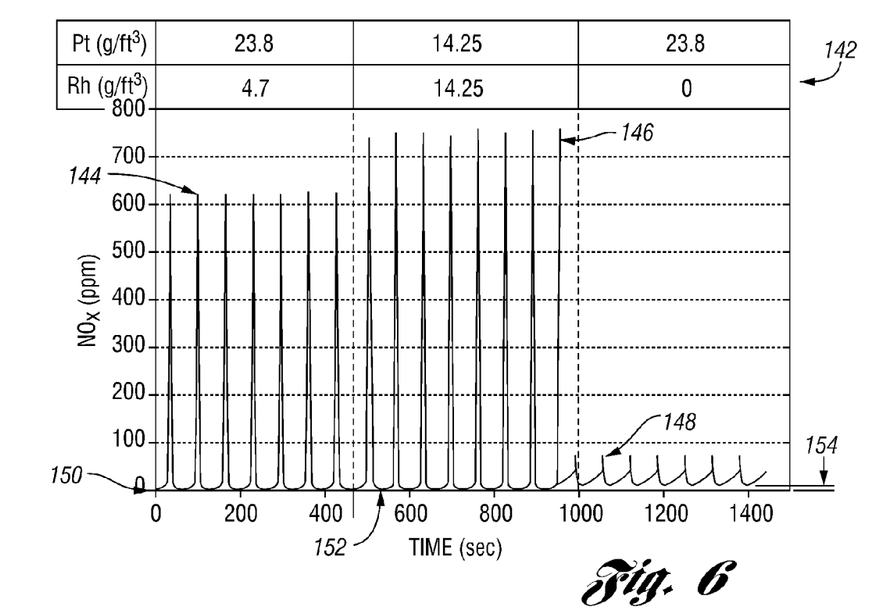
FIG. 6 illustrates the $NO_x$ emission as a function of time of exposure of certain examples of the reverse platinum group metal zoned lean $NO_x$ trap components at a relatively high temperature according to at least one embodiment of this invention.

Referring now to FIG. 6, a second by second data graph for a fresh component of a lean $NO_x$ trap system 12 illustrates the amount of $NO_x$ measured by the 60/5 $NO_x$ conversion efficiency test in the analyzer 136 using specimens at the platinum and rhodium concentrations listed in a header table 142. The inlet temperature of this trial is 450° C. and the space velocity is 25,000/hour.

Between zero and about 450 seconds, a quantity of emissions graph of the component is illustrated. The specimen has the platinum and rhodium total PGM content of 28.5 g/ft$^3$ with the ratio of platinum to rhodium of 83.5% by weight platinum and 16.5% by weight rhodium. The observed peak $NO_x$ emissions during this time of purges is about 620 ppm as illustratively shown at a peak 144. The overall $NO_x$ conversion averaged over lean and rich periods is 87%.

Between 450 seconds and 900 seconds, the quantity of emissions graph is illustrated for the component having the platinum and rhodium total PGM content of 28.5 g/ft$^3$ with the ratio of platinum to rhodium of 50% by weight platinum and 50% by weight rhodium. The observed peak $NO_x$ emissions during purges is about 740 ppm as illustratively shown at a peak 146. The overall $NO_x$ conversion averaged over lean and rich periods is 85%.

Between 900 seconds and 1450 seconds, the quantity of emissions graph is illustrated for the component having the platinum only content of total PGM content of 23.8 g/ft$^3$ with the ratio of platinum to rhodium of 100% by weight platinum. This is the equivalent amount of platinum as in the first component sample in this test. The observed peak $NO_x$ emissions during purges is about 75 ppm as illustratively shown at a peak 148. The overall $NO_x$ conversion averaged over the lean and rich periods is 95%.

A $NO_x$ storage capacity for each respective specimen at the relatively high temperature of 450° C. is illustrated in areas 150, 152, and 154. In this non-limiting example, the $NO_x$ storage capacity is very high as indicated by the difference between the zero baseline and the relative bottoms of the graphs of measured $NO_x$. If the $NO_x$ storage capacity had been low, the emissions would be similar to the 500 ppm NO feed gas level. The first two catalysts in this figure are essentially storing all of the $NO_x$ during lean periods. During rich periods they release some of the $NO_x$ so the overall efficiency is in the mid 80's. The third, Pt-only, catalyst has slightly less ability to store $NO_x$ relative to the other two. However, it has significantly less purge $NO_x$ release at high temperature due to lower oxygen storage capacity, which results from the absence of rhodium. As a consequence, it averages better conversion.

Figure 7:
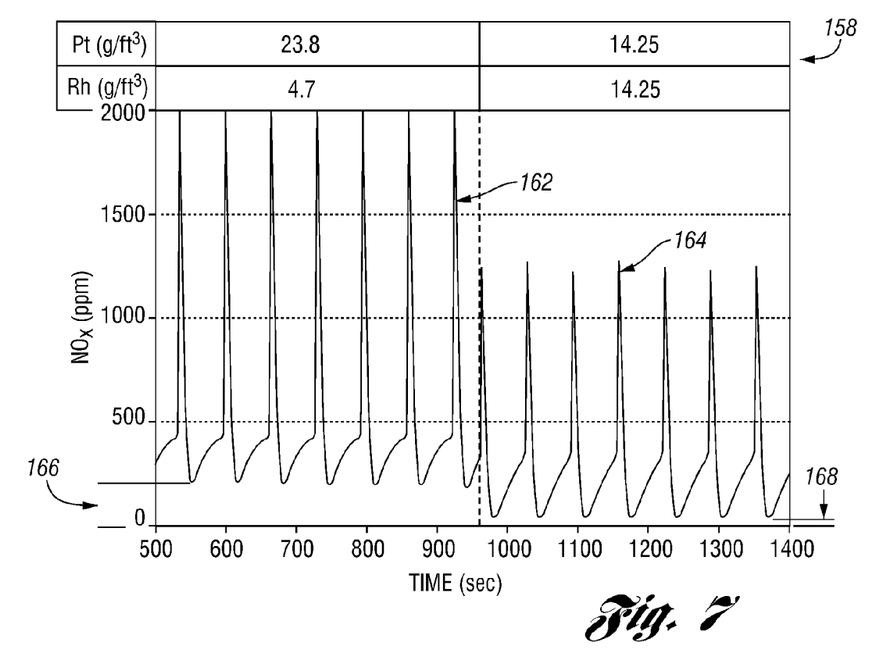
FIG. 7 illustrates the $NO_x$ emission as a function of time of exposure of certain embodiments of the reverse platinum group metal zoned lean $NO_x$ trap components at a relatively low temperature according to at least one embodiment of this invention.

Referring now to FIG. 7, a second by second data graph for a fresh component of a lean $NO_x$ trap system 12 is illustrated. The amount of $NO_x$ measured in the analyzer 136 is illustrated for the specimens at the platinum and rhodium concentrations are listed in a header table 158. The inlet temperature of this trial is the relatively low temperature of 250° C. and the space velocity is 25,000/hour.

Between 500 and about 950 seconds, the quantity of emissions graph of the component is illustrated for the component having the platinum and rhodium in the total PGM content of 28.5 g/ft$^3$ with the ratio of platinum to rhodium of 83.5% by weight platinum and 16.5% by weight rhodium. The observed peak $NO_x$ emissions during this time of purges is about 2000 ppm as illustratively shown at a peak 162.

Between 950 seconds and 1400 seconds, the quantity of emissions graph is illustrated of the component having the platinum and rhodium in the total PGM content of 28.5 g/ft$^3$ with the ratio of platinum to rhodium of 50% by weight platinum and 50% by weight rhodium. The observed peak $NO_x$ emissions during the purge is about 1250 ppm as illustratively shown at a peak 164.

A $NO_x$ storage capacity at the relatively low temperature of 250° C. is illustrated in areas 166 and 168. In this non-limiting graph, the $NO_x$ storage capacity is relatively lower than that of the similar components at 450° C. as indicated by the relative differences in $NO_x$ concentration after the catalyst between the zero baseline and the relative bottoms of the graphs of measured $NO_x$ indicated in the FIG. 6 areas 150 and 152 versus FIG. 7 areas 166 and 168.

The trap with higher rhodium content has higher $NO_x$ remediation during the rich periods. This leads to more complete purging of the trap. More complete purging has the consequence of better $NO_x$ storage efficiencies during subsequent lean periods, as illustrated by comparing area 168 to area 166.

Figure 8:
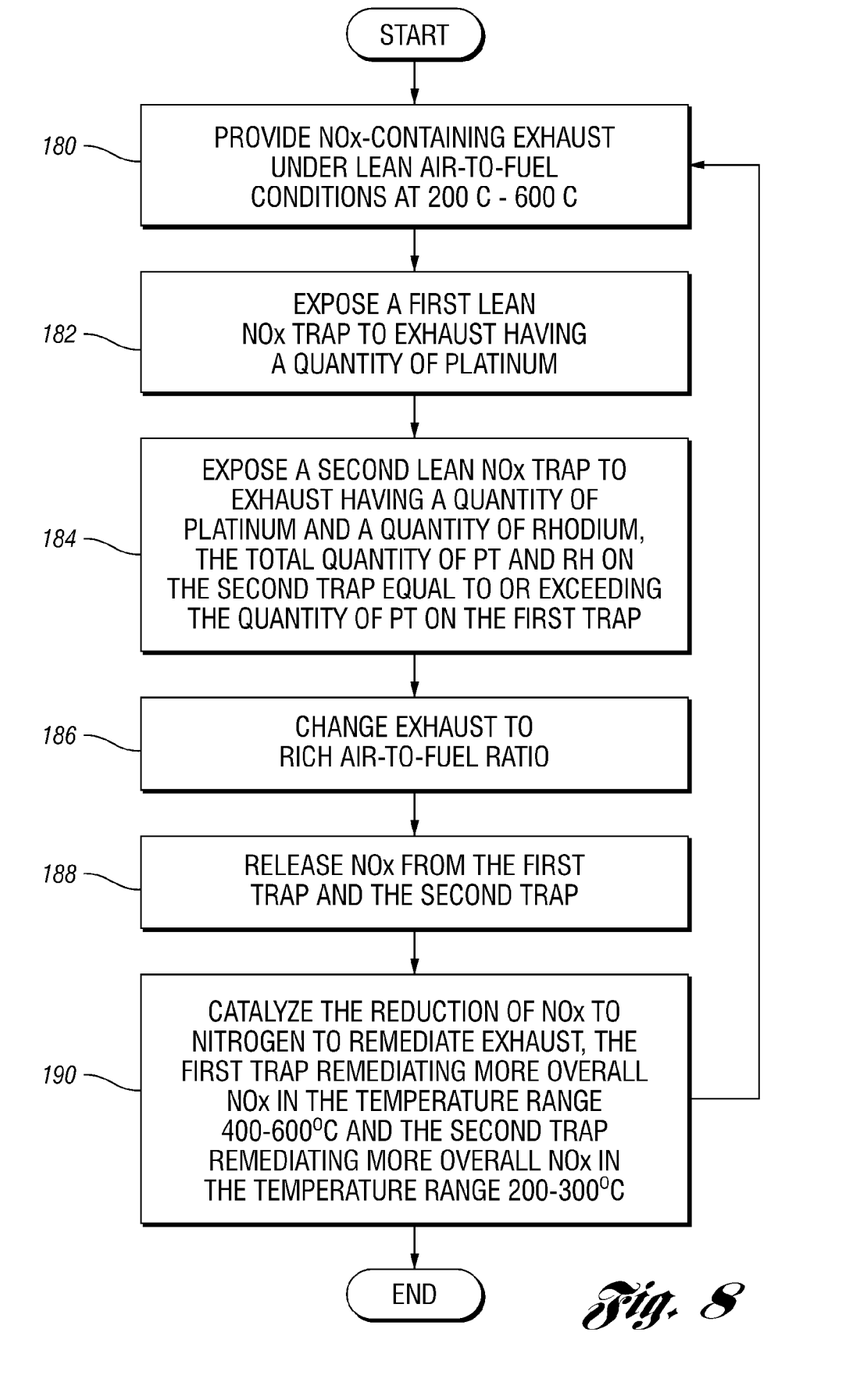
FIG. 8 illustrates an embodiment of a method for using the reverse platinum group metal zoned lean $NO_x$ trap to remediate the $NO_x$ emission from an engine according to at least one embodiment of this invention.

Referring now to FIG. 8, an embodiment of a method for using the reverse PGM zoned lean $NO_x$ trap system 12 is illustrated. In step 180, a $NO_x$ containing exhaust under lean air-to-fuel conditions is provided to an exhaust system, like exhaust system 6, feeding the reverse PGM zoned lean $NO_x$ trap system, such as the trap system 12, at temperatures ranging from 200° C. to 600° C. As an exhaust, an example of which may be exhaust 20, enters the PGM zoned lean $NO_x$ trap system at step 182, it exposes to the exhaust an upstream lean $NO_x$ trap, such as the first trap 14. The exhaust continues in the exhaust system and in step 184 exposes a downstream lean $NO_x$ trap, like the second trap 16. The result of steps 182 and 184 is that unreacted $NO_x$ is stored on the lean $NO_x$ traps. As the lean $NO_x$ traps become increasingly saturated with stored $NO_x$, a vehicle engine controller initiates a change to the chemistry of the exhaust stream as illustrated in the rich air-to-fuel ratio change in step 186. It should be understood that the rich air-to-fuel ratio is generally considered to be less than 14.7.

In step 188, during the period of rich air-to-fuel ratio conditions, stored nitrates decompose to $NO_x$ and are released to react with the reductants in the exhaust (CO, $H_2$, hydrocarbons) on nearby Pt and Rh sites. The $NO_x$ is then catalyzed in step 190 to reduce the $NO_x$ to nitrogen gas and thereby remediate the exhaust. It should be understood that this method describes certain embodiments and certain temperature regimes but may also be effective for other embodiments and other temperature regimes. Non-limiting examples of the temperature regimes range from temperatures selected independently from 200° C., greater than 200° C., 225° C., 250° C., 275° C., or 300° C. and 600° C., less than 600° C., 550° C., 500° C., 475° C., 450° C., 425° C., or 400° C.

Example 1

Using the fresh lean $NO_x$ trap having 28.5 g/ft³ platinum and rhodium in the total PGM content, in the apparatus of FIG. 4, with 60/5 $NO_x$ conversion efficiency test, where during the test cycle of a lean period of 60 seconds of lean air-to-fuel ratio conditions followed by a rich period of five seconds of rich air-to-fuel ratio conditions and a space velocity of 25,000/hour, the $NO_x$ conversions at 250° C. are measured. The inlet concentrations of gases are as follows: nitric oxide at 500 ppm by volume, carbon dioxide at 10%, water vapor at 10%, oxygen at 5% when the lean condition is being used, carbon monoxide at 5% plus hydrogen at 1.7% when the rich condition is being used. The flow rate is 2.5 L/min.

The specimen having 83.5% by weight platinum and 16.5% rhodium by weight converts about 7% of the $NO_x$. The specimen having 50% by weight platinum and 50% by weight rhodium surprisingly converts 54% of the $NO_x$. This may demonstrate that the trap with the greater amount of rhodium receives the benefit of both $NO_x$ storage efficiencies as well as better $NO_x$ reduction efficiency when operating at low temperature.

Example 2

Using the same experimental set up as an example 1, a second by second data analysis indicates that the specimen having 83.5% by weight platinum and 16.5% by weight rhodium stores some of the $NO_x$, and then releases most of the stored $NO_x$ in a short period during the rich purge. Therefore, the overall $NO_x$ conversion efficiency is only 7%. A relatively large amount of $NO_x$ is released without being reduced to nitrogen because the exhaust temperature is too low for Pt to be an effective catalyst, and the Rh content is too low. The relatively poor $NO_x$ reduction efficiency results in relatively poor purging of the sample. The poor purging then leads to relatively poor storage efficiency during the lean periods. The poor storage efficiency is illustrated by the minimum $NO_x$ emission being a relatively high 250 ppm due to poor purging of the sample.

The second specimen allows approximately 1200 ppm $NO_x$ is released in the same manner. The same specimen has a minimum $NO_x$ emission of about 50 ppm by volume $NO_x$, which is relatively lower than the 250 ppm $NO_x$ emission observed with the other catalyst in this example. Therefore, the second specimen having the relatively higher rhodium content is purged more completely as discussed above.

Example 3

Using the same experimental set up as in example 1, except that the temperature is set to 450° C., a second by second data analysis indicates that the specimen having 83.5% by weight platinum and 16.5% by weight rhodium allows only about 610 ppm by volume $NO_x$ as the peak emission during purge $NO_x$ release. The second specimen, which does so well in example 2, does not perform as well relative to the first specimen under these conditions. The second specimen permits about 714 ppm by volume $NO_x$ to be emitted during purge.

The two samples have overall $NO_x$ conversion efficiencies that are relatively close, 85% and 81%. Both samples have good storage efficiencies during the lean periods, but have high purge $NO_x$ release during the rich periods. The sample with 50% Rh has slightly higher purge $NO_x$ release than the sample with 16% Rh because of the higher level of Rh, which promotes the OSC and thereby increases the purge $NO_x$ release.

The Pt-only lean $NO_x$ trap in this example had relatively the best overall $NO_x$ conversion at high temperature. While not wishing to be bound by any one theory, the relatively high $NO_x$ conversion efficiency of the Pt-only trap is indicated by the relatively low levels purge $NO_x$ release due to the relatively lower OSC effect. However, the Pt-only trap has relatively lower $NO_x$ storage efficiency than the Pt/Rh samples during the lean storage periods as illustrated in the area 154. In terms of overall conversion at the higher temperature, the Pt-only catalyst has the best overall conversion in this Example. This is the result of the good $NO_x$ storage efficiency coupled with the relatively lower purge $NO_x$ release at high temperature.

Example 4

In order to investigate the root cause of the difference in performance of the fresh lean $NO_x$ traps described above, a series of additional tests were run. Specimens of lean $NO_x$ traps as in the examples above are aged in a laboratory aging on a pulse flame combustion reactor. The space velocity on the reactor is about 90,000/hour. Nitrogen, oxygen and a zero-ppm sulfur gasoline are fed to a pulsator reactor which then provides the exhaust stream to a three-way catalyst and the lean $NO_x$ trap. The three-way catalyst is upstream of the lean $NO_x$ trap and is only 50% of the length of the lean $NO_x$ trap sample. The three-way catalyst is aged at 850° C. temperature and reaches a maximum temperature of its bed at 1000° C. The lean $NO_x$ trap is aged at 800° C., and reaches a maximum bed temperature of 900° C. This is referred to as system aging at 800° C.

Example 5

Another embodiment of laboratory aging is on pulse flame combustion reactors. The space velocity on these reactors is about 90,000/hour. Nitrogen, oxygen and a 30-ppm sulfur gasoline are fed to a pulsator reactor which then provides the exhaust stream to a three-way catalyst and the lean $NO_x$ trap. The three-way catalyst is upstream of the lean $NO_x$ trap and is only 50% of the length of the lean $NO_x$ trap sample. The three-way catalyst reaches a maximum temperature of its bed 1040° C. The lean $NO_x$ trap is aged at 650° C., and reaches a maximum bed temperature of 680° C. This is referred to as system aging at 650° C.

Example 6

A measurement for $NO_x$ capacity is NS85, the $NO_x$ stored when the instantaneous storage efficiency is equal to 85%. The $NO_x$ storage capacity is measured during a temperature sweep of 200° C. to 600° C. in 50° C. increments. The space velocity is 25000/hour. The $NO_x$ capacity valuations are run using either a 5/3 or a 10/3 capacity test described below. This nomenclature for capacity tests means that the lean cycle is either five minutes or 10 minutes in duration and the rich cycle is three minutes in duration.

The inlet gas composition is as follows:

TABLE 1

|  | Lean Conditions | Rich Conditions |
| --- | --- | --- |
| Duration | 5 or 10 minutes | 3 minutes |
| Carbon Dioxide | 10% by volume | 10% by volume |
| Water Vapor | 10% by volume | 10% by volume |
| $NO_x$ | 500 ppm by volume | 500 ppm by volume |
| Oxygen | 5% by volume |  |
| Carbon Monoxide |  | 1.2% by volume |
| Hydrogen |  | 0.4% by volume |
| Make up Nitrogen |  | 3.4% by volume |
| Bulk Nitrogen | Balance | Balance |

Example 7

Running the 60/5 test protocol at a space velocity of 10,000/hour simulates the low-flow portion of the ECE portion of the ECE+EUDC test procedure. The $NO_x$ conversion is measured during a temperature sweep of 200° C. to 600° C. in 50° C. increments. The space velocity is 10000/hour. The $NO_x$ conversion valuations are measured. The lean cycle is 60 seconds in duration and the rich cycle is five seconds in duration as described below.

The inlet gas composition is as follows:

TABLE 2

|  | Lean Conditions | Rich Conditions |
| --- | --- | --- |
| Duration | 60 seconds | 5 seconds |
| Carbon Dioxide | 10% by volume | 10% by volume |
| Water Vapor | 10% by volume | 10% by volume |
| $NO_x$ | 500 ppm by volume | 500 ppm by volume |
| Oxygen | 5% by volume |  |
| Carbon Monoxide |  | 12.5% by volume |
| Hydrogen |  | 4.3% by volume |
| Bulk Nitrogen | Balance | Balance |

The flow rate of the carbon monoxide and hydrogen at 10,000/hr space velocity is the same as in the 25,000/hr space velocity in Example 1 in order to adequately purge the sample under low flow conditions. This results in the relatively higher concentrations of CO and $H_2$ in this protocol relative to Example 1.

Overall the flow rate in this Example is 1.0 L/min.

Example 8

Using a 10/3 capacity test as described in example 6 with two $NO_x$ traps, the total $NO_x$ capacity and NS85 are compared at 250° C. to 300° C. A first $NO_x$ trap has 1.0 g per liter of platinum and rhodium in the platinum group metal content at a ratio of 83.5% by weight platinum to 16.5% by weight rhodium and has a barium component in the layer 34. A second $NO_x$ trap has the same platinum group metal content but at a ratio of 50% by weight platinum to 50% by weight rhodium. This $NO_x$ trap also supports barium such as in the layer 34.

At the relatively low temperature, the first $NO_x$ trap having the lower quantity of rhodium stores a significantly greater quantity of $NO_x$ than does the second $NO_x$ trap having the higher relative quantity of rhodium. At 300° C., the measured NS85 value for the second $NO_x$ trap was about 0.4, while the value for the first $NO_x$ trap with the lower rhodium content is about 1.25.

The total $NO_x$ storage capacity and NS85 are similar for the first and second lean $NO_x$ traps in this experiment at relatively higher temperatures between 400° C. and 550° C.

A third lean $NO_x$ trap specimen for this example, having 0.51 g per liter of rhodium only, and no platinum, stored much less of the same quantity of $NO_x$ at 300° C. as the first lean $NO_x$ trap having approximately the same quantity of rhodium, but having platinum. The NS85 value measured for the third lean $NO_x$ trap in this example, was almost 0.0 g per liter indicating relatively poor $NO_x$ storage capacity from rhodium at the relatively low temperatures below 300° C. While not wishing to be bound by any one theory, the relatively low total $NO_x$ storage capacity and NS85 value for this example may arise from relatively poor NO oxidation by rhodium at this temperature regime.

Example 9

Using the 60/5 test method at 25,000/hr space velocity illustrated in example 1, and the fresh samples of the same three lean $NO_x$ trap specimens of example 8, the second lean $NO_x$ trap having the higher rhodium content equivalent with the platinum content has relatively significantly greater average $NO_x$ conversion efficiency than does the first lean $NO_x$ trap having 83.5% by weight platinum and only 16.5% by weight rhodium. At 250° C., the second lean $NO_x$ trap has average $NO_x$ conversion efficiency of 54% versus only 7% for the first lean $NO_x$ trap. A surprising result is that the first lean $NO_x$ trap actually had a higher $NO_x$ storage capacity when studied by the 10/3 test of example 6.

Using an additional fourth test specimen which is a lean $NO_x$ trap having only platinum at 0.84 g per liter total platinum group metal content, and using the same test as the other specimens in this example, shows that at 450° C. to 550° C. the fourth test specimen has the best average $NO_x$ conversion efficiency.

Further results of the tests at 250° C. in this example indicate that the second lean $NO_x$ trap specimen having 50% by weight platinum and 50% by weight rhodium experiences relatively lower $NO_x$ spikes and better storage efficiency of $NO_x$ than does the first lean $NO_x$ trap specimen having 83.5% by weight platinum and 16.5% by weight rhodium. Better purging likely implies higher storage efficiencies during lean periods.

Example 10

A rich purge test is performed to confirm the hypotheses generated by the surprising results of example 9. The rich purge test is conducted at 450° C. with a space velocity of 25,000/hour. The overall $NO_x$ conversion percentage is averaged over the lean and rich condition periods of the test. In the rich purge test, the length of period in which rich conditions exist varies from one to 20 seconds. The settings are as follows:

TABLE 3

|  | Lean Condition | Rich Condition |
| --- | --- | --- |
| Duration | 60 seconds | 1 to 20 seconds |
| Carbon Dioxide | 10% by volume | 10% by volume |
| Water Vapor | 10% by volume | 10% by volume |
| $NO_x$ | 500 ppm by volume | 500 ppm by volume |
| Oxygen | 5% by volume |  |
| Carbon Monoxide |  | 5.0% by volume |
| Hydrogen |  | 1.7% by volume |
| Bulk Nitrogen | Balance | Balance |

The purge test confirms the relatively superior performance of the second lean $NO_x$ trap having 50% to platinum by weight and 50% rhodium by weight at 250° C. This appears to be particularly true with very short purge times of greater than three seconds to at least 20 seconds.

The tests with short purges in this example of the 60/5 test, show that the $NO_x$ trap specimens with 50% by weight platinum and 50% by weight rhodium may be beneficial for overall $NO_x$ conversion efficiency at low temperatures. They may reduce $NO_x$ release or $NO_x$ spikes during purging. They may also experience more thorough purges leaving better lean storage efficiencies for the period when lean conditions are present. The test results also show that rhodium may be more effective than platinum in facilitating the oxygen storage component at 300° C. The oxygen storage component may provide an exothermic reaction after the lean to rich transition and thereby improving the purging of $NO_x$ during the rich condition. The exotherm results from the reaction between the reductants (CO, $H_2$, HC) and oxygen from ceria. The reduction of ceria is actually endothermic, but the reaction between the reductants and the oxygen makes the overall lean-to-rich transition exothermic. The exothermic reaction of the oxygen storage component can relatively improve purging at low temperatures such as 250° C. to 300° C. by increasing the catalyst bed temperature relative to a formulation without OSC. Raising the bed temperature increases the relative Pt catalytic activity. But it is primarily responsible for the purge of $NO_x$ release at relatively high temperatures between 400° C. and 550° C.

The tests of examples 4 to 10 show in certain embodiments of this invention that the alternative explanations for improving the purging when there is higher rhodium content at the relatively lower temperatures of less than 300° C., do not actually contribute appreciably to the relatively superior $NO_x$ reduction capability. In specific, reductive elimination of $NO_x$, the oxygen storage capacity, or the water gas shift reaction do not contribute substantially to the improved purging observed with the relatively higher level of rhodium content specimens at low temperatures. Without wishing to be constrained by any one theory, it appears that the improved purging of a lean $NO_x$ trap having 50% platinum by weight and 50% rhodium by weight is due to superior $NO_x$ reduction capability because under reducing rich conditions the Rh converts the $NO_2$ released by the neighboring $NO_x$ storage sites to $N_2$. This improved conversion of $NO_x$ to nitrogen promotes the decomposition of more nitrates. Decomposing more nitrates improves purging and, therefore, higher $NO_x$ storage efficiencies during subsequent lean periods.

Example 11

Rhodium may be more effective than platinum for promoting $NO_x$ reduction at relatively low temperatures of less than 300° C. The platinum and rhodium content of the $NO_x$ trap where the platinum content is 50% by weight and rhodium content is 50% by weight may be best for $NO_x$ conversion at the relatively low temperature less than 300° C. However, certain embodiments of the lean $NO_x$ trap may need more platinum content for relatively good nitrogen oxide oxidation, particularly after aging.

The platinum-only lean $NO_x$ trap is the better formulation at relatively high temperatures such as 400° C. to 600° C. due to lower oxygen storage capacity, and, therefore, less purge $NO_x$ release. At 400° C.-600° C., platinum is effective for $NO_x$ reduction during rich operation.

In regard to catalyst durability, while not wishing to be bound by any one theory, it appears that the platinum does not crystallize relatively larger during aging if rhodium is absent than if rhodium is present. Also, during high temperature aging, the first brick performs most of the exothermic reactions during high temperature aging. This protects the rear brick from those exothermic reactions, which improves the durability of the rear brick and helps it maintain its low temperature performance. These durability considerations support the embodiments of the invention where the first trap brick is formulated with low Rh content.

Therefore, these examples illustrate how certain embodiments of the reverse platinum group metal zoned lean $NO_x$ trap systems can surprisingly broaden the process window in terms of temperature at which relatively high conversions of $NO_x$ emissions can be remediated compared to previous designs. Further, certain embodiments of the reverse platinum group metal zoned lean $NO_x$ trap systems can use less rhodium content and still achieve desired $NO_x$ conversion performance.

Example 12

Similar specimens as those used in Example 8 are aged prior to evaluation using the system aging at 800° C. method as described in Example 4 at space velocities of 25,000/hr and 10,000/hr.

The average overall $NO_x$ conversion efficiency during the 25,000/hr test using the 60/5 test lean and rich periods indicate that the specimens with platinum and rhodium, as opposed to platinum-only or rhodium-only, have greater efficiency in the temperature range of 260° C. to 500° C. The platinum-only lean $NO_x$ trap perform slightly better than any platinum and rhodium lean $NO_x$ trap at 540° C. to 600° C., indicating that platinum is about as effective as Rh for $NO_x$ reduction at that temperature regime.

During the 10,000/hr test, approximately the same relative trends in average overall $NO_x$ conversion efficiency are very similar to the 25,000/hr test above. However, the magnitude of conversion efficiency increases by about 20 absolute % or more at the lower space velocity. It may be estimated that for these embodiments of formulations and aged test conditions, that more than 14.8 g/ft$^3$ (0.5 g/L) of platinum may be desired in certain embodiments for certain emission conditions, such as after high temperature aging, to maintain good $NO_x$ remediation performance.

Example 13

Similar specimens as those used in Example 12 are aged prior to evaluation using the system aging at 650° C. as described in Example 5 at space velocities of 25,000/hr and 10,000/hr.

The overall average $NO_x$ conversion efficiency during the 25,000/hr test using the 60/5 test lean and rich periods indicate that specimens with platinum and rhodium have greater efficiency from 175° C. to 375° C. relative to the platinum-only and the rhodium-only samples. In the range of 450° C. to 600° C., the platinum-only lean $NO_x$ trap specimen has the greater efficiency for $NO_x$ conversion.

As in Example 12, reducing the space velocity to 10,000/hr improves the absolute overall $NO_x$ conversion efficiency relative to the 25,000/hr higher velocity. Also, the trend of greatest overall efficiency relative overall $NO_x$ conversion efficiency trends remain nearly the same. Combined platinum and rhodium lean $NO_x$ traps provide the best efficiency from about 250° C. to 375° C. A platinum-only aged lean $NO_x$ trap has the best efficiency from 375° C. to 600° C.

While the best mode for carrying out the invention has been described in detail, those familiar with the art to which this invention relates will recognize various alternative designs and embodiments for practicing the invention as defined by the following claims.

What is claimed:

1. A lean $NO_x$ trap system for remediating a $NO_x$ emission in an exhaust system of a vehicle having an exhaust stream and capable of operation during one or more lean periods and one or more rich periods, the system comprising:
    a first trap connected to the exhaust system of the vehicle, the first trap having a first substrate supporting a first quantity of platinum and a first quantity of rhodium, the first quantity of rhodium including a zero amount;
    a second trap connected to the exhaust system of the vehicle, the second trap having a second substrate supporting a second quantity of platinum and a second quantity of rhodium;
    the first trap being positioned upstream of the second trap relative to a direction of the exhaust stream;
    the second quantity of rhodium being greater than or equal to the first quantity of rhodium;
    when compared to the first trap, the second trap having a higher overall $NO_x$ conversion at a first temperature and a lower overall $NO_x$ conversion at a second temperature greater than the first temperature.

2. The lean $NO_x$ trap system of claim 1, the first trap contains the first quantity of rhodium.

3. The lean $NO_x$ trap system of claim 2, wherein the total loading of platinum and rhodium on the first trap being less than the total loading of platinum and rhodium on the second trap.

4. The lean $NO_x$ trap of claim 2, wherein the ratio of the first quantity of rhodium to the second quantity of rhodium is in the range of 0:14 to 7:14, based on weight per unit volume.

5. The lean $NO_x$ trap system of claim 2, wherein the ratio of the first quantity of rhodium to the second quantity of rhodium is in the range of 0:4 to 1:4, based on weight per unit volume.

6. The lean $NO_x$ trap system of claim 2, wherein the ratio of the first quantity of platinum to the second quantity of platinum is in the range of 2:10 to 5:10, based on weight per unit volume.

7. The lean $NO_x$ trap system of claim 1, wherein the first temperature range is 250° C. to 350° C.

8. The lean $NO_x$ trap system of claim 1, wherein the second temperature range is 350° C. to 600° C.

9. The lean $NO_x$ trap system of claim 1, wherein the volume ratio of the first trap to the second trap is in the range 1:3 to 3:1.

10. A lean $NO_x$ trap for remediating a $NO_x$ emission in an exhaust system of a vehicle having an exhaust stream and capable of operation during one or more lean periods and one or more rich periods, the trap comprising:
    a first portion connected to the exhaust system of the vehicle, the first portion having a first quantity of platinum and a first quantity of rhodium, the first quantity of rhodium including a zero amount;
    a second portion connected to the exhaust system of the vehicle, the second portion having a second quantity of platinum and a second quantity of rhodium;
    the first portion being positioned upstream of the second portion relative to a direction of the exhaust stream; and
    the second quantity of rhodium being greater than or equal to the second quantity of rhodium.

11. The lean $NO_x$ trap of claim 10, wherein the volume ratio of the first portion to the second portion is in the range of 1:3 to 3:1.

12. The lean $NO_x$ trap of claim 10, wherein the quantity of platinum on either the first or the second portion is in the range of 20 g/ft$^3$ to 100 g/ft$^3$.

13. The lean $NO_x$ trap of claim 10, wherein the quantity of rhodium on the second portion is in the range of 2 g/ft$^3$ to 30 g/ft$^3$.

14. The lean $NO_x$ trap of claim 10, wherein the second portion further includes cerium on a supported catalyst.

15. The lean $NO_x$ trap of claim 14, wherein the first portion further includes cerium within a range of 0-60 micromoles of oxygen per gram of the supported catalyst when in a fresh condition, the second portion includes cerium within a range of 30-90 micromoles of oxygen per gram of the supported catalyst when in a fresh condition, and the ratio of cerium on the second portion to the first portion is greater than 1.0.

16. The lean $NO_x$ trap of claim 10, wherein the first portion further supports a quantity of rhodium and the total loading of platinum and rhodium on the first portion being less than the platinum and rhodium on the second portion.

17. A method for remediating a $NO_x$ emission using a lean $NO_x$ trap system for a vehicle, comprising:
    (a) providing an exhaust system from an engine of the vehicle having a first trap supporting a first quantity of platinum and a first quantity of rhodium, the first quantity of rhodium including a zero amount, and a second trap supporting a second quantity of platinum and a second quantity of rhodium, the second quantity of rhodium being greater than or equal to the first quantity on a mass per unit volume basis, the first trap being positioned closer in the system to the engine than the second trap;
    (b) exposing the exhaust system to an exhaust containing $NO_x$ at a lean air-to-fuel ratio at an exhaust inlet temperature in the range of 200° C. to 600° C.;
    (c) changing the exhaust air-to-fuel ratio to a rich air-to-fuel ratio; and
    (d) catalyzing the reduction of the stored $NO_x$ to a nitrogen gas in either the first trap or the second trap or both traps in order to remediate the $NO_x$ emission, wherein the first trap remediates more $NO_x$ than the second trap when the exhaust temperature is in a range of 400° C. to 600° C. and the second trap remediating more $NO_x$ than the first trap when the exhaust inlet temperature is in a range of 200° C. to 300° C.

18. The method of claim 17, wherein the second quantity of rhodium on the second trap is in the range of 2 g/ft$^3$ to 50 g/ft$^3$.

19. The method of claim 17, wherein the second trap further comprises cerium on a supported catalyst, the cerium being within a range of 30-90 micromoles of oxygen per gram of the supported catalyst when in a fresh condition, the ratio of cerium on the second trap to the first trap being greater than 1.0, wherein a ratio of the quantity of platinum supported by the first trap to the quantity of platinum supported by the second trap is in the range of 2:10 to 5:10, when expressed in a weight per unit volume basis, and a ratio of the quantity of rhodium supported by the first trap to the quantity of rhodium supported by the second trap is in the range of 0:4 to 1:4 when expressed in a weight per unit volume basis.

20. The method of claim 17, wherein the volume of the first trap differs from the volume of the second trap.

21. The lean $NO_x$ trap system of claim 1, wherein the first quantity of rhodium in the first trap is in the range of 0 g/ft$^3$ to 5 g/ft$^3$.

* * * * *